US008277141B1

(12) United States Patent
Labar et al.

(10) Patent No.: US 8,277,141 B1
(45) Date of Patent: Oct. 2, 2012

(54) BALL AND SOCKET JOINT FOR INDIRECT FIRE WEAPON

(75) Inventors: John R. Labar, Bangor, PA (US); William F. Seppelt, Hillsborough, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 47 days.

(21) Appl. No.: 12/984,194

(22) Filed: Jan. 4, 2011

(51) Int. Cl.
*F16C 11/06* (2006.01)

(52) U.S. Cl. ...................................... 403/114; 89/37.12

(58) Field of Classification Search .................... 403/76, 403/90, 114, 115, 122, 135; 248/288.31; 89/37.12, 37.13, 27.11; 42/94
See application file for complete search history.

(56) References Cited

U.S. PATENT DOCUMENTS

| | | | | | |
|---|---|---|---|---|---|
| 2,200,283 | A | * | 5/1940 | Lennon | 89/37.03 |
| 2,477,253 | A | * | 7/1949 | Jasse | 89/1.3 |
| 2,558,024 | A | * | 6/1951 | Weiss et al. | 89/37.05 |
| 2,694,342 | A | * | 11/1954 | Canoune | 89/37.13 |
| 3,003,399 | A | * | 10/1961 | Donner | 89/37.13 |
| 3,074,322 | A | * | 1/1963 | Jasse | 89/27.11 |
| 3,146,008 | A | * | 8/1964 | George | 403/71 |
| 3,586,358 | A | * | 6/1971 | Kiesow | 403/122 |
| 4,660,458 | A | * | 4/1987 | von Laar et al. | 89/25 |
| 4,744,283 | A | * | 5/1988 | Ibarra | 89/27.12 |
| 4,864,912 | A | * | 9/1989 | Ibarra | 89/27.11 |
| 5,429,032 | A | * | 7/1995 | Cytron | 89/37.05 |
| 6,113,301 | A | * | 9/2000 | Burton | 403/122 |
| 7,676,979 | B1 | * | 3/2010 | Mertz | 42/94 |
| 2006/0228168 | A1 | * | 10/2006 | Burnley | 403/122 |
| 2009/0126250 | A1 | * | 5/2009 | Keng | 42/94 |
| 2011/0219945 | A1 | * | 9/2011 | Sayir et al. | 89/37.05 |

* cited by examiner

*Primary Examiner* — Joshua Kennedy

(74) *Attorney, Agent, or Firm* — Michael C. Sachs

(57) ABSTRACT

An indirect fire weapon may include a base cap with a ball end. The ball end may be inserted in or removed from a socket cap in a base plate at only a single combination of a traverse angle and an elevation angle of the weapon. The indirect fire weapon may rotate 360 degrees in the socket cap and may be elevated from the vertical down to a set declivity.

13 Claims, 10 Drawing Sheets

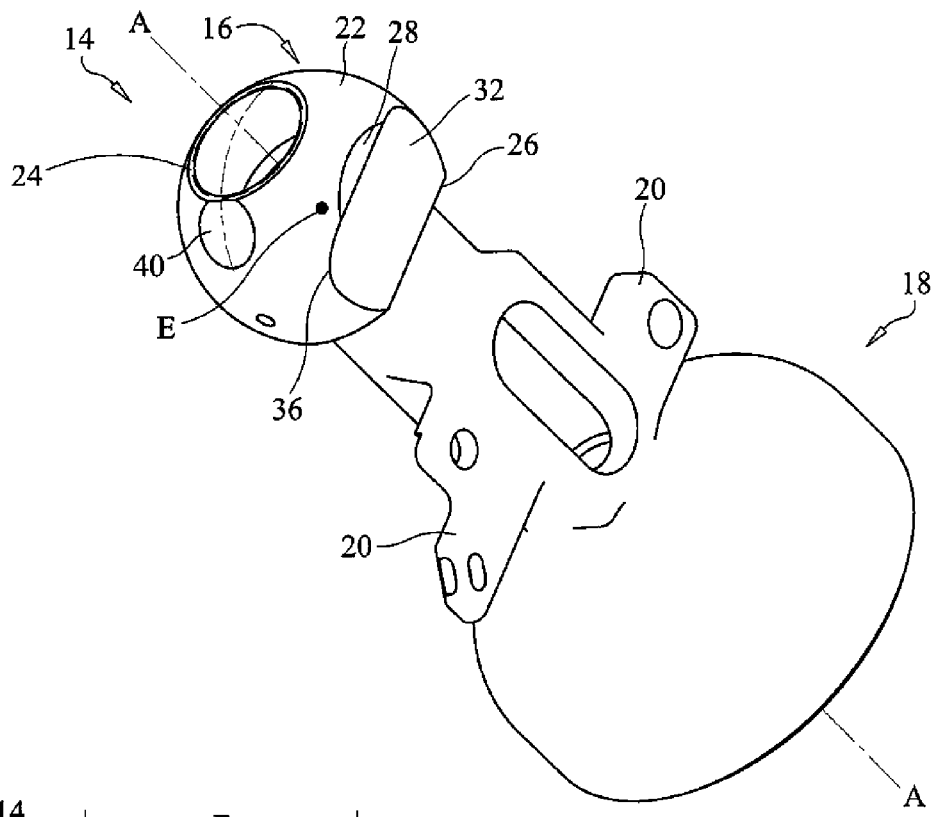
FIG. 2A
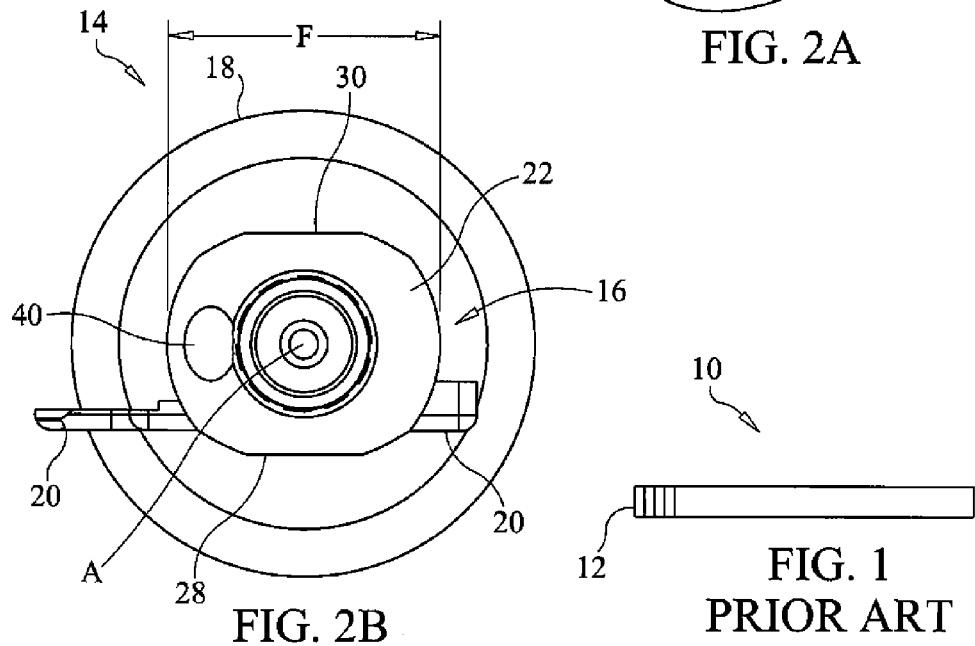
FIG. 2B
FIG. 1
PRIOR ART

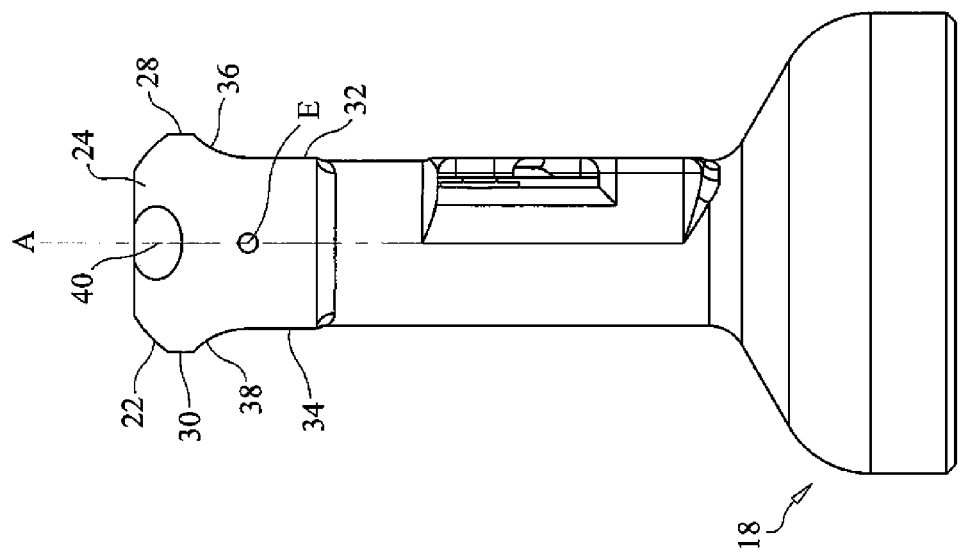
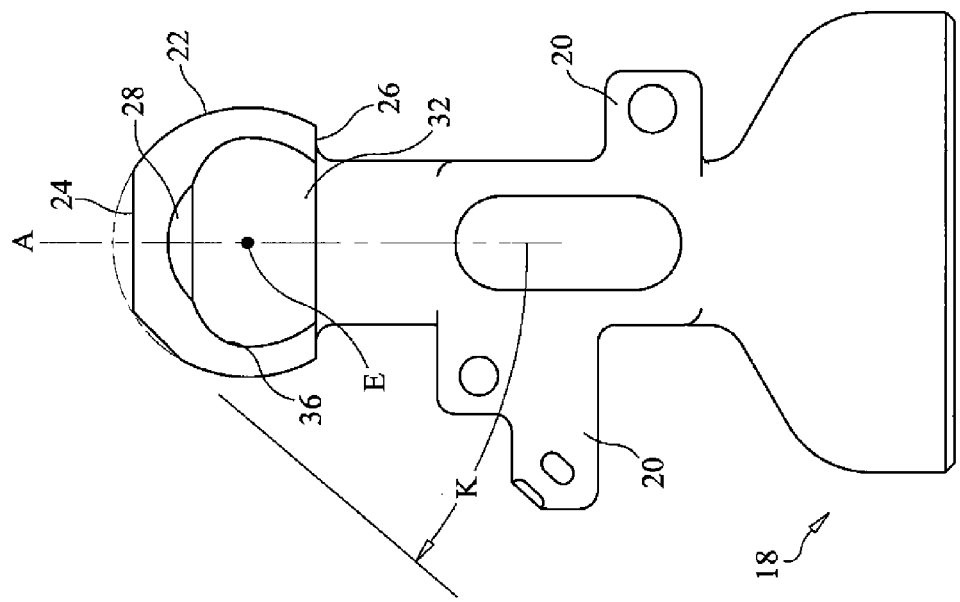

BALL AND SOCKET JOINT FOR INDIRECT FIRE WEAPON

STATEMENT OF GOVERNMENT INTEREST

The inventions described herein may be manufactured, used and licensed by or for the U.S. Government for U.S. Government purposes.

BACKGROUND OF THE INVENTION

The invention relates in general to munitions and in particular to indirect fire weapons.

A mortar is an example of an indirect fire weapon. A known mortar is the M224 60 mm (millimeter) mortar system. The M224 mortar system includes three different base plates, a cannon assembly, a bipod assembly, and a sight unit. The cannon assembly is the M225 cannon assembly, which includes a 60 mm tube and a base cap for the tube. One of the base plates, known as the M7 base plate, is used with the M225 cannon assembly and the bipod assembly for sustained operations. During sustained operations, the bipod assembly supports the 60 mm tube.

Another of the base plates, known as the M8, is a smaller base plate used primarily in the system's hand held mode during offensive or mobile operations. The M8 base plate is significantly lighter than the M7 base plate. But, the M8 base plate limits the range and directions the mortar can be fired.

The third base plate, known as the M8X, has the weight advantage of the M8 base plate. When using the M8X base plate, the M225 cannon can be fired in the same ranges and directions as when using the M7 base plate. However, the M8X base plate uses the M7 style of interface between the cannon assembly and the base plate. The M7 and M8X style of interface does not allow the M224 mortar system to be carried in the "hand held" mode, fully assembled and ready to fire.

The M225 cannon assembly is connected to the M7 and M8X base plates via a ball and socket joint. The ball and socket joint allows freedom of movement (traverse and elevation) of the cannon assembly to facilitate all required angles of fire. However, there are several combinations of traverse and elevation angles where the cannon assembly can become separated from the base plate. Because of these multiple angle combinations where the cannon assembly and base plate can become disengaged, the base plate may fall free from the base cap. This may occur when a warfighter lifts the mortar system by the handle in the hand held mode, for example, to quickly reposition the mortar system to respond to a new threat or call for fire. The M8 base plate does not have the problem of the base cap and base plate disengaging, because the M8 base plate uses a clamp to hold the assembly together. However, the M8 base plate clamp limits the use of the M224 system in the handheld configuration.

Proposed solutions involve either a complete redesign of the base cap or the addition of multiple small parts to the assembly. A complete redesign of the base cap may cause the loss of a significant investment in the base cap production tooling (casting and forging dies). The addition of multiple small parts may increase the logistical burden, require additional assembly steps, and increase the risk of losing of one or more of the small parts during operations.

A need exists for an apparatus to enable use of the light-weight M8X base plate in the hand-held mode of the M224 mortar system, but with the full range of traverse and elevation equivalent to the heavy M7 base plate.

SUMMARY OF THE INVENTION

It is an object of the invention to provide an apparatus to enable use of the light-weight M8X base plate in the hand-held mode of the M224 mortar system, but with the full range of traverse and elevation equivalent to the heavy M7 base plate.

One aspect of the invention is an apparatus including a member with a ball end, and a socket. The ball end of the member may be insertable in the socket at only a single combination of traverse angle and elevation angle of the member. The member may include a base cap. The socket may include a socket cap. The apparatus may be used with an indirect fire weapon.

The base cap may include a longitudinal axis, the ball end of the member, a bell end, and a handle mounting face. The ball end may include a generally spherical surface having a center C and a diameter D. The generally spherical surface may be truncated at both axial ends. The generally spherical surface may include first and second pairs of opposed flats and a pair of opposed curved surfaces that join respective ones of the first and second pairs of opposed flats.

The generally spherical surface may include a fifth flat having a bisecting plane that is orthogonal to a bisecting plane of the first and second pairs of opposed flats. The fifth flat may lie in a plane angled at about 45 degrees with respect to a plane that 1) contains the longitudinal axis of the base cap and 2) is orthogonal to a plane containing the handle mounting face.

The socket cap may receive the ball end of the base cap. The socket cap may include an annular disk with an annular bottom surface. The annular bottom surface may have a central circular opening. The central circular opening may have a center and a diameter of a size to form a clearance fit with the spherical surface of the ball end of the base cap.

The socket cap may include a first surface defined by a spherical surface centered at the center of the circular opening in the annular bottom surface and having a same diameter as the circular opening. The socket cap may include second and third surfaces defined by a pair of spaced apart parallel planes orthogonal to the annular bottom surface and parallel to a bisecting plane of the socket cap.

The socket cap may include a fourth surface defined by a surface angled with respect to a plane of the annular bottom surface. The fourth surface may extend from the first surface circumferentially and be centered about the bisecting plane of the socket cap.

The socket cap may include a fifth surface defined by a generally right circular cylinder having a longitudinal axis that intersects the center of the circular opening and is normal to the plane of the annular bottom surface. The socket cap may include a sixth surface defined by a plane parallel to and spaced apart from the annular bottom surface. The socket cap may include a seventh surface defined by a plane orthogonal to the sixth surface and the bisecting plane of the socket cap.

Eighth and ninth opposed surfaces of the socket cap may be defined by a right circular cylinder disposed symmetrically with respect to the bisecting plane and having a longitudinal axis that includes center C. The diameter of the right circular cylinder that defines the eighth and ninth opposed surfaces may be about equal to D.

Tenth and eleventh surfaces of the socket cap may be defined by a pair of opposed right circular cylinders with longitudinal axes that form an angle with the plane of the annular bottom surface, form an angle with respect to the bisecting plane, and are symmetric with respect to the bisecting plane.

The apparatus may include a base plate. The socket cap may be rotatably disposed in the base plate. The base cap may be rotatable in the base plate through 360 degrees of traverse. An angle of elevation of the base cap may vary from vertical to about 45 degrees from vertical.

A distance between the second and third surfaces may be a clearance fit with the first pair of opposed flats. A circumferential extent of the fourth surface may be about 120 degrees. The fourth surface may be angled at about 45 degrees with respect to the plane of the annular bottom surface.

The eighth and ninth opposed surfaces may include first edges that abut the seventh surface and the spherical surface, and second edges that abut the second and third surfaces, respectively.

The apparatus may include a tab that projects above the sixth surface and abuts the seventh surface. The bisecting plane of the socket cap may bisect the tab and the seventh surface.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 1 is a schematic side view of a mortar cannon.
FIG. 2A is a perspective view of a novel base cap for a mortar cannon.
FIG. 2B is a top view of FIG. 2A.
FIG. 2C is a side view of FIG. 2B.
FIG. 2D is an end view of FIG. 2C.

DETAILED DESCRIPTION OF THE PREFERRED EMBODIMENTS

A novel base cap and a novel socket cap for an indirect fire weapon may enable use of the existing light-weight M8X base plate in the hand-held mode of the M224 mortar system, but with the full range of traverse and elevation equivalent to the heavy M7 base plate. The novel base cap may be made by modifying the known base cap for the M225 cannon assembly. The modification to the known base cap may be accomplished at the unit level, if necessary. The novel socket cap may replace the known socket cap in the M8X base plate. The known socket cap may be easily removed from the M8X base plate. The novel socket cap may be easily inserted in the M8X base plate at the unit level. An advantage of the invention is that the number of separate parts in the cannon assembly does not change. One known part of the cannon assembly, the base cap, may be modified, and the known socket cap may be replaced by the novel socket cap.

Figure 3:
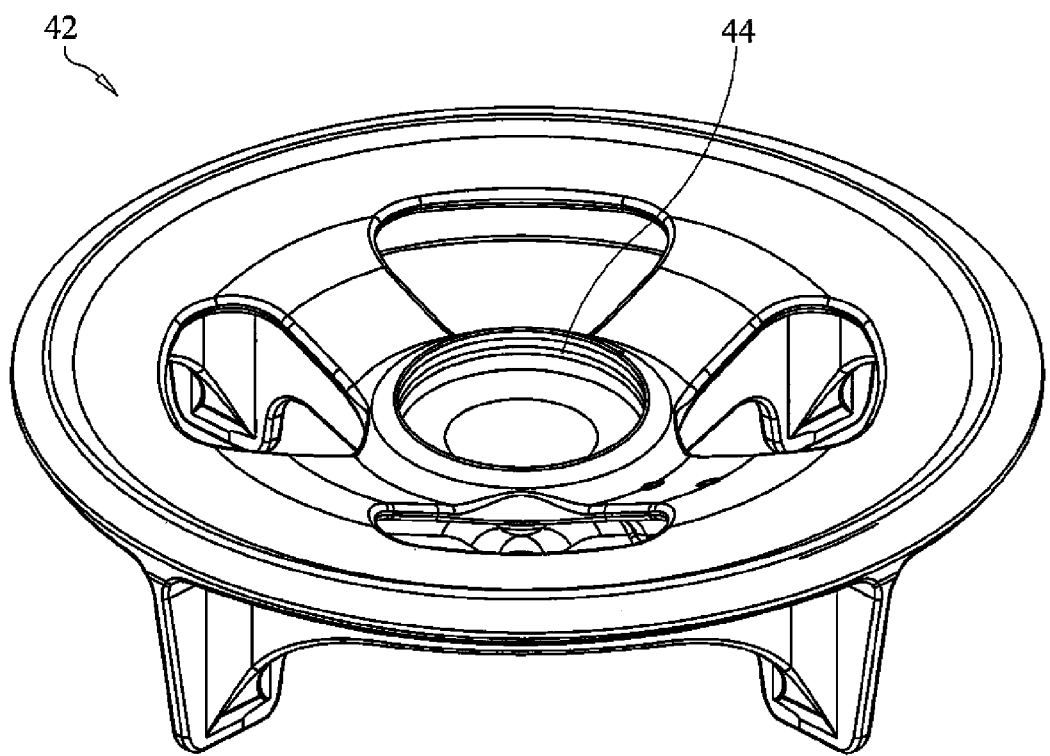
FIG. 3 is a perspective view of a base plate.

FIG. 1 is a schematic view of a known mortar cannon 10. Mortar cannon 10 may be, for example, an M224 mortar cannon. One end 12 of cannon 10 may be closed with a member, such as a base cap 14 (FIGS. 2A-D). Base cap 14 may have a longitudinal axis A, a ball end 16, a bell end 18, and a handle mounting face 20. Bell end 18 may be placed on end 12 of cannon 10 in a known manner. Ball end 16 may be inserted in a mortar system base plate 42 (FIG. 3).

Ball end 16 may include a generally spherical surface 22 having a center E and a diameter F. In one embodiment, diameter F may be about 45 mm (millimeters). Generally spherical surface 22 may be truncated at both axial ends 24, 26. A distance between truncated axial ends 24, 26 may be, for example, about 30.5 mm. Generally spherical surface 22 may include first and second pairs of opposed flats 28, 30 and 32, 34. A distance between first pair of flats 28, 30 may be, for example, about 37 mm. A distance between second pair of opposed flats 32, 34 may be, for example, about 28 mm. A pair of opposed curved surfaces 36, 38 may join respective ones of the first and second pairs of opposed flats 28, 30 and 32, 34. Curved surfaces 36, 38 may have radii of about 12 mm, for example.

Base cap 14 may be identical to a known base cap, except that base cap 14 may include a fifth flat 40 on ball end 16. Generally spherical surface 22 of base cap 14 may include fifth flat 40 having a bisecting plane that is orthogonal to a bisecting plane of the first and second pairs of opposed flats 28, 30 and 32, 34. Fifth flat 40 may lie in a plane angled at an angle K with respect to a plane that: 1) contains the longitudinal axis A of base cap 14; and 2) is orthogonal to a plane containing handle mounting face 20. In one embodiment, angle K may be about 45 degrees.

Base plate 42 (FIG. 3), for example, an MX8 base plate, may include an opening 44 for receiving a novel socket or socket cap 60 (FIGS. 4A-4G). Socket cap 60 may be rotatable in opening 44 in base plate 42. Socket cap 60 may be secured in opening 44 with a known spring-type retaining ring (not shown). When properly inserted in socket cap 60, base cap 14 (attached to cannon 10) may be secured to base plate 42 in all combinations of traverse (azimuth) and elevation angles, except for one.

To insert base cap 14 into socket cap 60, or to remove base cap 14 from socket cap 60, one may be required to position base cap 14 at a specific traverse angle (plus or minus about one degree) and a specific elevation angle (plus or minus about one degree). At the specific traverse angle and elevation angle, base cap 14 with attached cannon 10 may be lowered straight down into socket cap 60, or lifted straight up out of socket cap 60. At any other combination of traverse and elevation angles, base cap 14 may not be removed from socket cap 60. Thus, the mortar system may be carried fully assembled without base plate 42 separating from base cap 14.

Figure 4A:
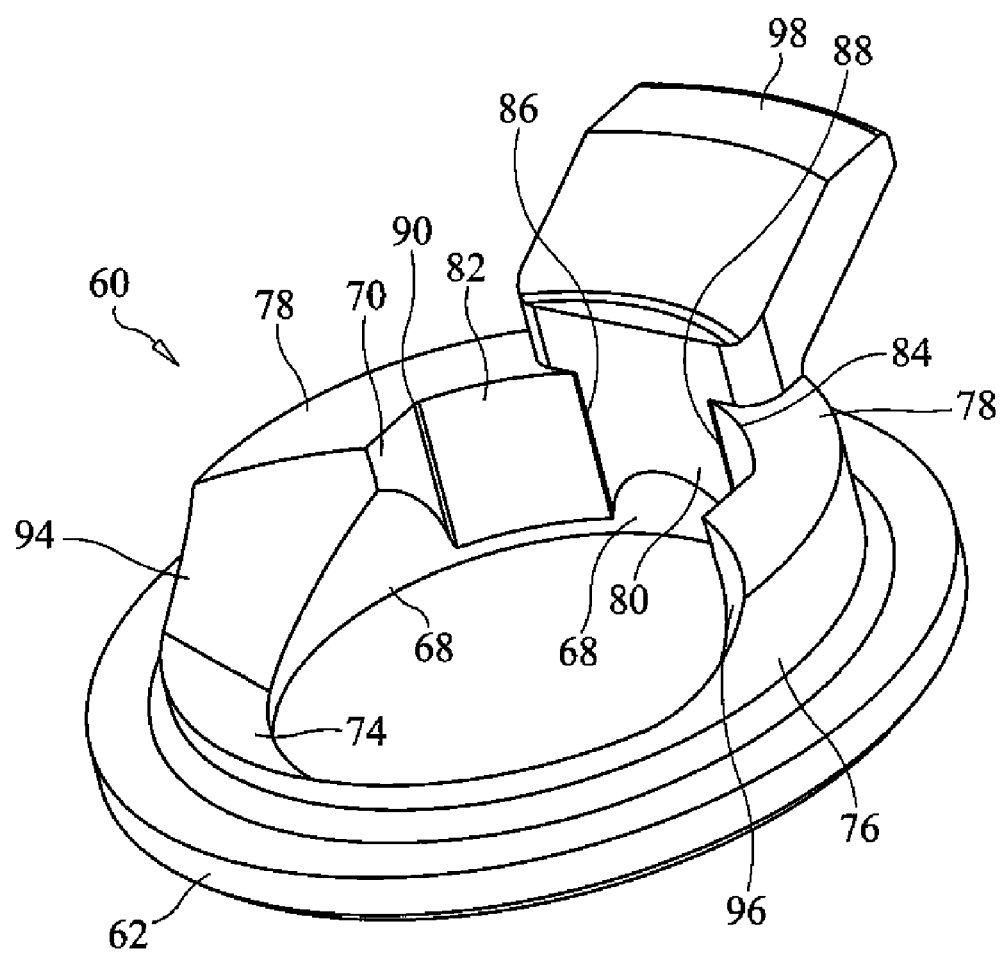
FIG. 4A is a perspective view of a novel socket cap.
Figure 4B:
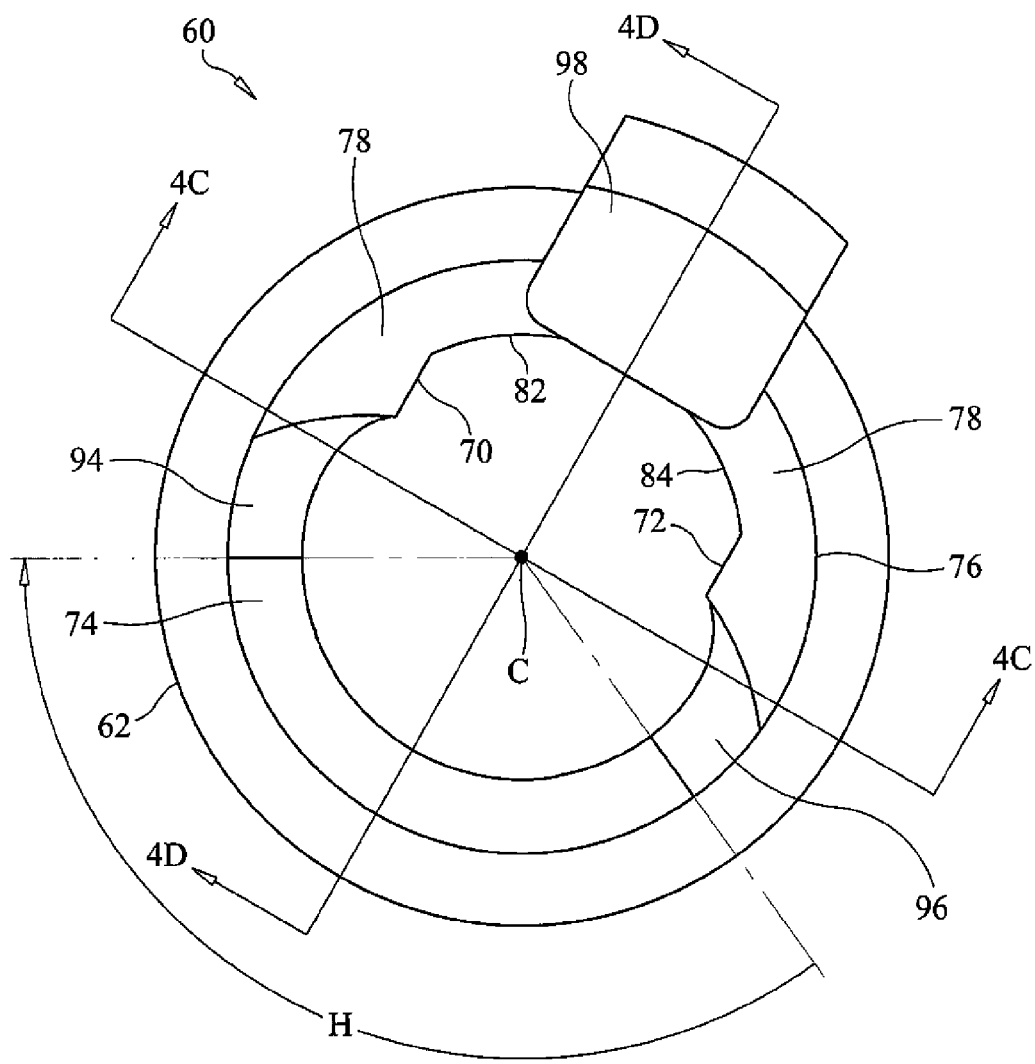
FIG. 4B is a top view of FIG. 4A.
Figure 4C:
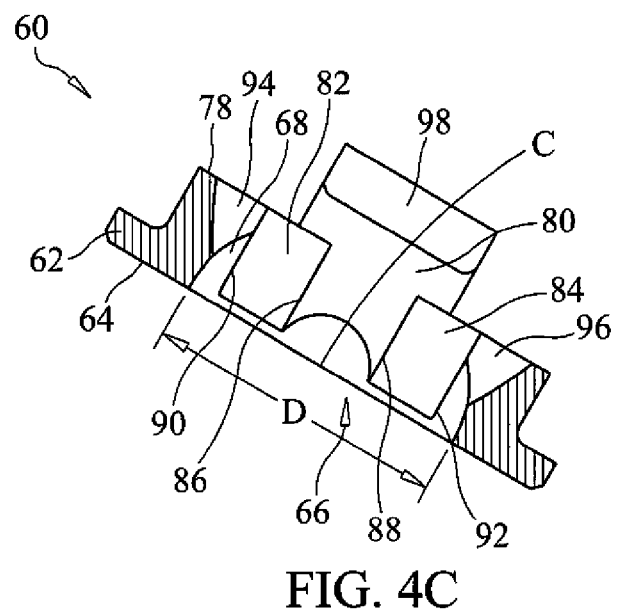
FIG. 4C is a sectional view taken along the line 4C-4C of FIG. 4B.
Figure 4D:
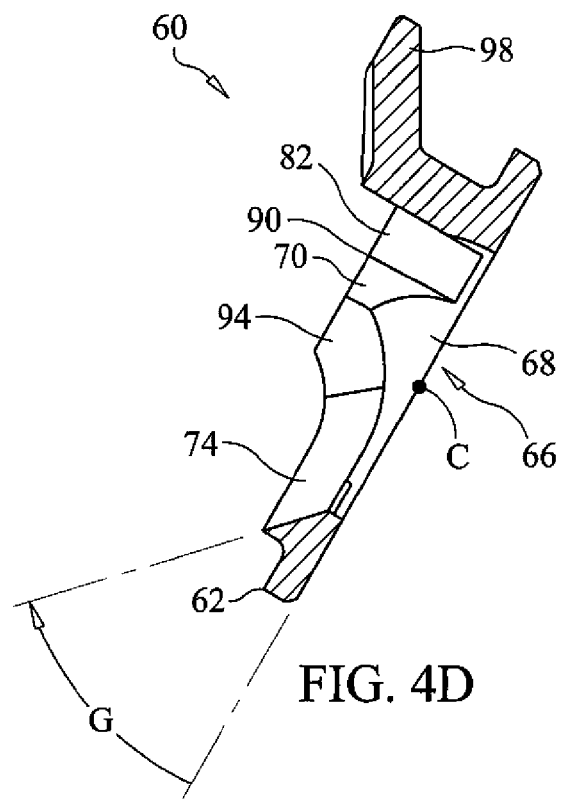
FIG. 4D is a sectional view taken along the line 4D-4D of FIG. 4B.
Figure 4E:
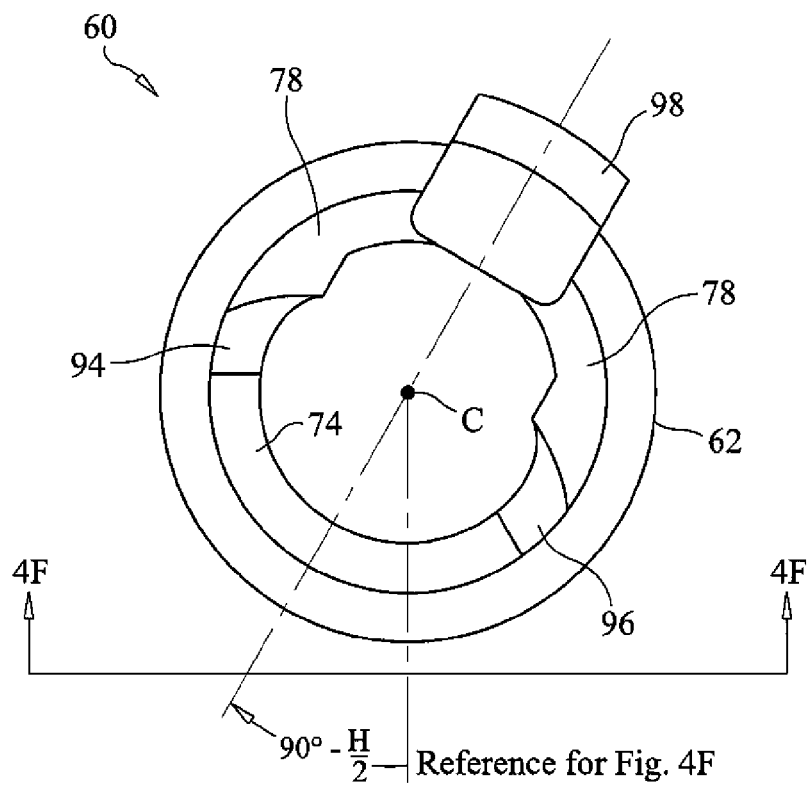
FIG. 4E is a top view of FIG. 4A.

Socket cap 60 may receive ball end 16 of base cap 14. Socket cap 60 may be made of, for example, aluminum or an aluminum alloy. The structure of socket cap 60 will be described with reference to FIGS. 4A-G. Socket cap 60 may include an annular disk 62 with an annular bottom surface 64 (FIG. 4C). Annular bottom surface 64 may have a central circular opening 66. Circular opening 66 may have a center C and a diameter D. Diameter D may be of a size to form a clearance fit with spherical surface 22 of ball end 16 of base cap 14.

A first surface 68 of socket cap 60 may be defined by a spherical surface centered at center C of circular opening 66 and having a same diameter D as circular opening 66.

Second and third surfaces 70, 72 of socket cap 60 may be defined by a pair of spaced apart parallel planes that are orthogonal to annular bottom surface 64 and parallel to a bisecting plane of socket cap 60. The bisecting plane of socket cap 60 is defined as the plane that contains the section line 4D-4D of FIG. 4B and is orthogonal to the annular bottom surface 64. The distance between the pair of spaced apart parallel planes that define surfaces 70, 72 may be such that a clearance fit is formed with first pair of flats 28, 30 of ball end 16.

A fourth surface 74 of socket cap 60 may be defined by a surface angled at an angle G (FIG. 4D) with respect to the plane of annular bottom surface 64. Angle G may represent the approximate minimum degree of elevation of cannon 10 from the horizontal. In one embodiment, angle G may be, for example, about 40 to 50 degrees. Fourth surface 74 may extend from first surface 68 over a circumferential extent of H degrees (FIG. 4B). The circumferential extent H of fourth surface 74 may define the amount one may traverse cannon 10, without additionally rotating socket cap 60 in opening 44 in base plate 42. Of course, because socket cap 60 may be rotatable in opening 44, cannon 10 may be traversed a full 360 degrees. The circumferential extent H of fourth surface 74 may be, for example, about 120 degrees. The circumferential extent H of fourth surface 74 may be centered about the bisecting plane of socket cap 60.

A fifth surface 76 of socket cap 60 may be defined by a generally right circular cylinder having a longitudinal axis that intersects center C of circular opening 66 and is normal to the plane of annular bottom surface 64. The cylinder that defines fifth surface 76 may have a diameter of about 60 mm, for example. The diameter of the cylinder that defines the fifth surface 76 may be primarily constrained by the size of opening 44 in base plate 42.

A sixth surface 78 of socket cap 60 may be defined by a plane that is parallel to and spaced apart from annular bottom surface 64. A distance between sixth surface 78 and annular bottom surface 64 may be, for example, about 16 mm.

A seventh surface 80 of socket cap 60, may be defined by a plane that is orthogonal to sixth surface 78, orthogonal to the bisecting plane of socket cap 60, and symmetric with respect to the bisecting plane of socket cap 60. Seventh surface 80 may be a distance of about 21 mm from a plane that is normal to the bisecting plane of socket cap 60 and that includes center C.

Eighth and ninth opposed surfaces 82, 84 of socket cap 60 may be defined by a right circular cylinder disposed symmetrically with respect to the bisecting plane of cap 60, having a longitudinal axis that includes center C, and a diameter of about D. Eighth and ninth opposing surfaces 82, 84 may abut seventh surface 80 and first surface 68 on edges 86, 88, respectively. Eighth and ninth opposing surfaces 82, 84 may abut second and third surfaces 70, 72 on edges 90, 92 respectively.

Figure 4F:
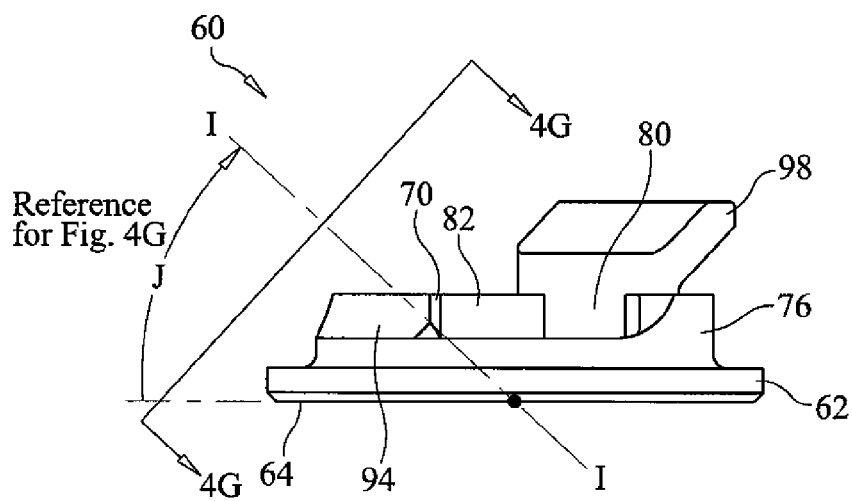
FIG. 4F is a view taken along the line 4F-4F of FIG. 4E.
Figure 4G:
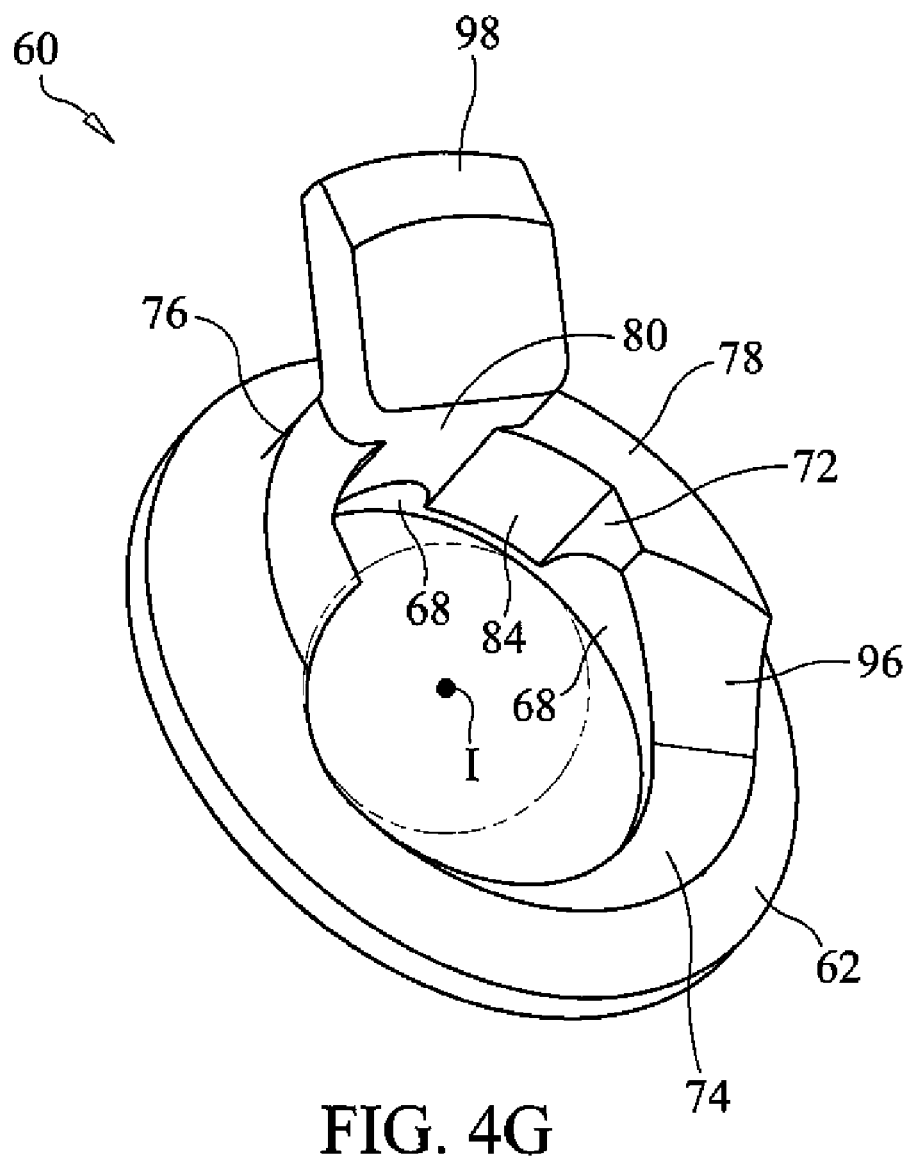
FIG. 4G is a view taken along the line 4G-4G of FIG. 4F.

Tenth and eleventh opposed surfaces 94, 96 of cap 60 may be defined by a pair of right circular cylinders each having a diameter slightly larger than the distance between second pair of opposed flats 32, 34 of ball end 16. Longitudinal axes of the cylinders that define surfaces 94, 96 may form an angle J (FIG. 4F) with the plane of annular bottom surface 64. The longitudinal axis T of one of the cylinders is shown in FIGS. 4F and 4G. In FIG. 4G, the cylinder surface that defines surface 94 is shown in phantom lines. Angle J may represent about the minimum angle of elevation of cannon 10 from the horizontal and may be the same as angle G. The longitudinal axes of the cylinders that define surfaces 94, 96 may be located at an angle of about H/2 (FIG. 4B) from the bisecting plane of the socket cap 60.

Socket cap 60 may include a tab 98 that is symmetric with respect to the bisecting plane of cap 60 and that abuts seventh surface 80. Tab 98 may have two functions. Tab 98 may function as a handle to rotate socket cap 60 in opening 44 in base plate 42. Tab 98 may function as an easily visible means of locating the bisecting plane of socket cap 60 to thereby insert or remove base cap 14 from socket cap 60.

Figure 5A:
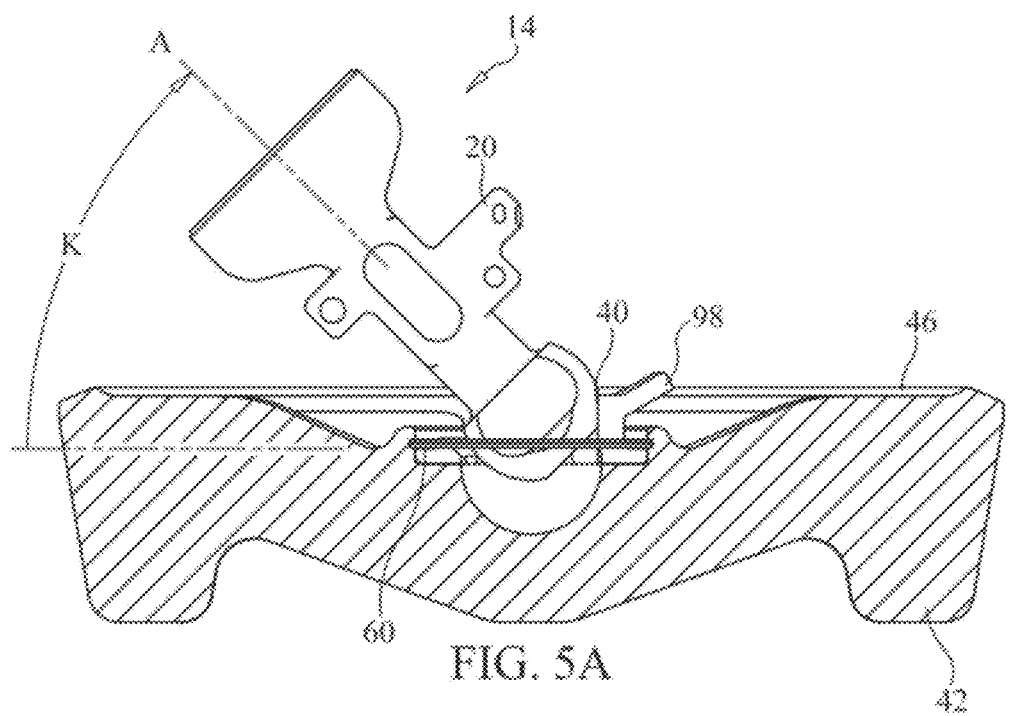
FIGS. 5A-D illustrate the process of inserting the base cap in the socket cap.
Figure 5B:
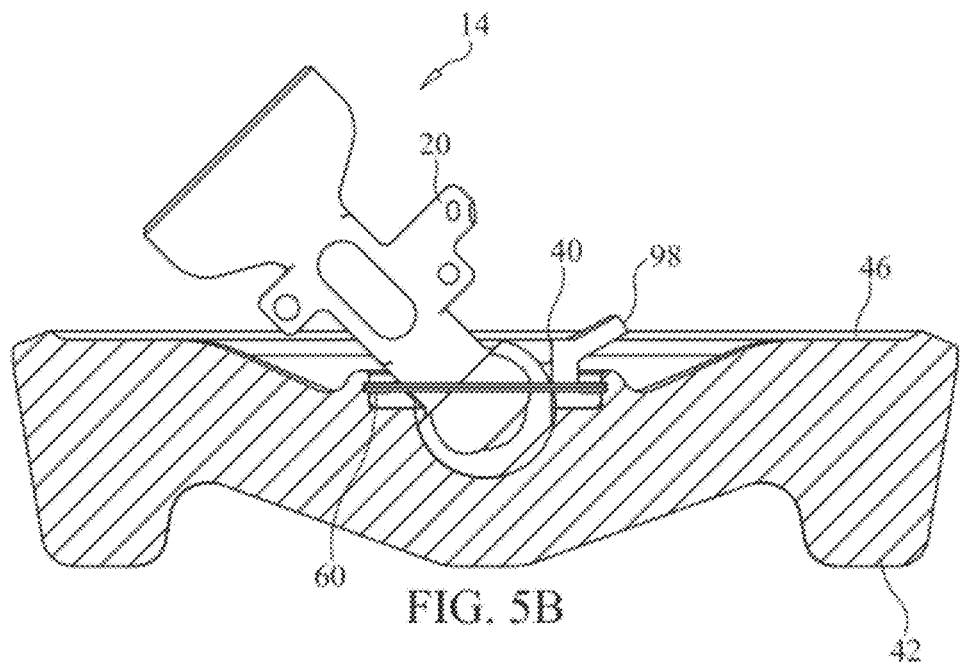

FIGS. 5A-D illustrate the process of inserting base cap 14 in socket cap 60. With base cap 14 oriented at K degrees to the face 46 of base plate 42, the fifth flat 40 on base cap 14 must face tab 98 (or seventh surface 80). As noted above, in one embodiment, angle K may be about 45 degrees. Longitudinal axis A of base cap 14 must be coplanar with the bisecting plane of socket cap 60. The plane of handle mounting face 20 of base cap 14 must be parallel to the bisecting plane of socket cap 60. Base cap 14 may then be inserted straight down (as shown in FIG. 5B) into socket cap 60. This orientation is also the orientation required to remove base cap 14 from socket cap 60.

Figure 5C:
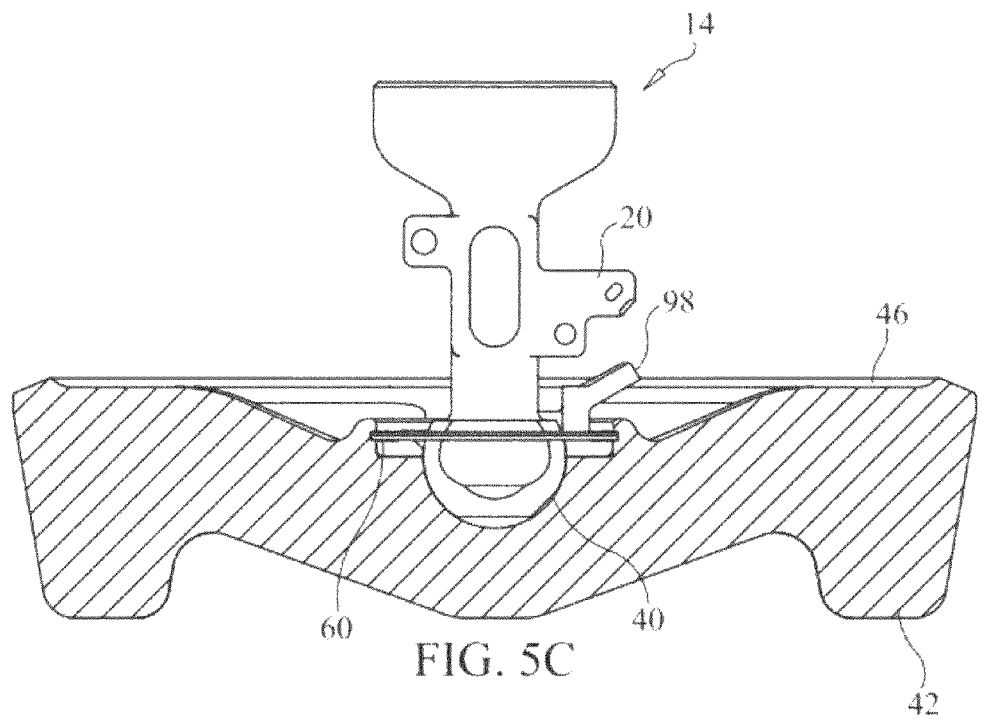
Figure 5D:
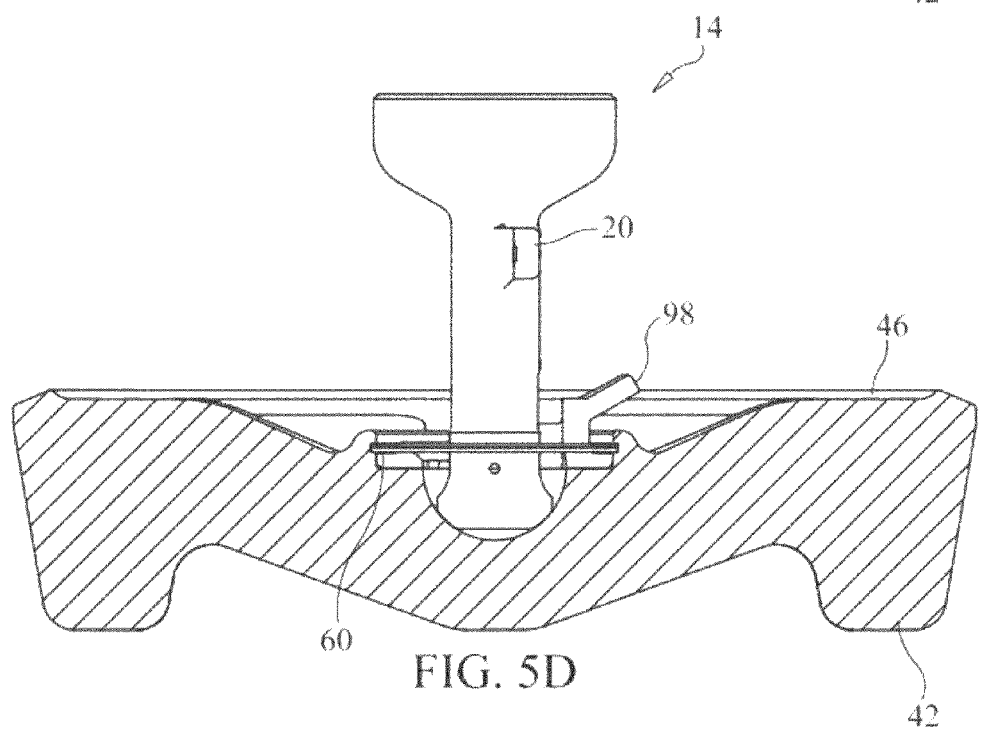

From the position shown in FIG. 5B, if base cap 14 is rotated upward, clockwise, or counterclockwise by about 2 degrees, then base cap 14 cannot be separated from socket cap 60. To securely connect base cap 14 to socket cap 60, base cap 14 may then be rotated upward to the vertical position, as shown in FIG. 5C. Then, base cap 14 may be rotated 90 degrees counterclockwise (or clockwise), as shown in FIG. 5D. Cannon 10, attached to base cap 14, may then be traversed 360 degrees and may be elevated from angle G upward to the vertical, without base cap 14 separating from socket cap 60.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. An apparatus used with an indirect fire weapon, comprising:
   a member with a ball end, a socket, and wherein the ball end of the member is insertable in the socket, and wherein the member further comprises a base cap, and said socket further comprises a socket cap, and;
   wherein the base cap includes a longitudinal axis, the ball end, a bell end, and a handle mounting face, and;
   the ball end includes a generally spherical surface having a center C and a diameter D, the generally spherical surface being truncated at both axial ends and including first and second pairs of opposed flats and a pair of opposed curved surfaces that join respective ones of the first and second pairs of opposed flats;
   the generally spherical surface includes a fifth flat having a bisecting plane that is orthogonal to a bisecting plane of the first and second pairs of opposed flats, the fifth flat lying in a plane angled at about 45 degrees with respect to a plane that 1) contains the longitudinal axis of the base cap and 2) is orthogonal to a plane containing the handle mounting face, and;
   wherein the ball end of the member is insertable in the socket at only a single combination of traverse angle and elevation angle of the member.

2. The apparatus of claim 1, wherein the socket cap receives the ball end of the base cap, the socket cap including an annular disk with an annular bottom surface, the annular bottom surface having a central circular opening, the circular opening having a center and a diameter of a size to form a clearance fit with the spherical surface of the ball end of the base cap.

3. The apparatus of claim 2, wherein the socket cap includes:
- a first surface defined by a spherical surface centered at the center of the circular opening in the annular bottom surface and having a same diameter as the circular opening;
- second and third surfaces defined by a pair of spaced apart parallel planes orthogonal to the annular bottom surface and parallel to a bisecting plane of the socket cap;
- a fourth surface defined by a surface angled with respect to a plane of the annular bottom surface, the fourth surface extending from the first surface circumferentially and being centered about the bisecting plane of the socket cap;
- a fifth surface defined by a generally right circular cylinder having a longitudinal axis that intersects the center of the circular opening and is normal to the plane of the annular bottom surface;
- a sixth surface defined by a plane parallel to and spaced apart from the annular bottom surface;
- a seventh surface defined by a plane orthogonal to the sixth surface and the bisecting plane of the socket cap;
- eighth and ninth opposed surfaces defined by a right circular cylinder disposed symmetrically with respect to the bisecting plane and having a longitudinal axis that includes center C, a diameter of the right circular cylinder that defines the eighth and ninth opposed surfaces being about equal to D; and
- tenth and eleventh surfaces defined by a pair of opposed right circular cylinders with longitudinal axes that form an angle with the plane of the annular bottom surface, form an angle with respect to the bisecting plane, and are symmetric with respect to the bisecting plane.

4. The apparatus of claim 3, wherein a distance between the second and third surfaces is a clearance fit with the first pair of opposed flats.

5. The apparatus of claim 4, wherein the angle of the longitudinal axes of the opposed right circular cylinders with respect to the plane of the annular bottom surface is a same angle as the angle of the fourth surface with respect to the plane of the annular bottom surface.

6. The apparatus of claim 5, wherein an angle of the longitudinal axes of the opposed right circular cylinders with respect to the bisecting plane is about 60 degrees.

7. The apparatus of claim 3, wherein a circumferential extent of the fourth surface is about 120 degrees.

8. The apparatus of claim 7, wherein the fourth surface is angled at about 45 degrees with respect to the plane of the annular bottom surface.

9. The apparatus of claim 3, wherein the eighth and ninth opposed surfaces include first edges that abut the seventh surface and the spherical surface, and second edges that abut the second and third surfaces, respectively.

10. The apparatus of claim 3, further comprising a tab that projects above the sixth surface and abuts the seventh surface wherein the bisecting plane bisects the tab and the seventh surface.

11. The apparatus of claim 1, further comprising a base plate, the socket cap being rotatably disposed in the base plate.

12. The apparatus of claim 11, wherein the base cap is rotatable in the base plate through 360 degrees of traverse.

13. The apparatus of claim 1, wherein a distance from the fifth flat to the center C is about 0.48 D.

* * * * *